United States Patent [19]
Courchesne

[11] Patent Number: 6,056,117
[45] Date of Patent: May 2, 2000

[54] CD CARRYING CASE HAVING A BUILT-IN POP COVER

[75] Inventor: Simon Courchesne, Quebec, Canada

[73] Assignee: Technologie Ansi, Quebec, Canada

[21] Appl. No.: 09/171,038

[22] PCT Filed: Feb. 12, 1998

[86] PCT No.: PCT/CA98/00107

§ 371 Date: Jul. 14, 1999

§ 102(e) Date: Jul. 14, 1999

[87] PCT Pub. No.: WO98/36415

PCT Pub. Date: Aug. 20, 1998

[51] Int. Cl.[7] .................................................. B65D 85/57
[52] U.S. Cl. ...................... 206/308.1; 206/310; 206/493; 312/9.63
[58] Field of Search .................................. 206/308.1, 309, 206/310, 311, 312, 313, 493; 312/9.9, 9.41, 9.63

[56]  References Cited

U.S. PATENT DOCUMENTS

| | | |
|---|---|---|
| 4,664,261 | 5/1987 | Frodelius . |
| 4,884,685 | 12/1989 | Ackeret . |
| 5,000,316 | 3/1991 | Lerner . |
| 5,158,176 | 10/1992 | Wolf . |
| 5,213,209 | 5/1993 | Song . |
| 5,265,721 | 11/1993 | Castritis . |
| 5,346,074 | 9/1994 | Overholser . |
| 5,515,979 | 5/1996 | Salvail . |
| 5,526,926 | 6/1996 | Deja . |
| 5,533,615 | 7/1996 | McCamy . |
| 5,549,199 | 8/1996 | Lindsay . |

FOREIGN PATENT DOCUMENTS 675 498 A2   3/1995   European Pat. Off. .

*Primary Examiner*—Paul T. Sewell
*Assistant Examiner*—Nhan T. Lam
*Attorney, Agent, or Firm*—Myers Bigel Sibley & Sajovec, P.A.

[57]  ABSTRACT

A CD carrying case having a built-in pop up cover is disclosed. The case comprises a box-like base shell adopted to receive the compact disc and a cover shell sized to fit over the base shell and having a rear end hingely connected to a rear end of the base shell. The cover shell is pivotable between an open position away from the base shell for opening the case and a close position against the base sheel for closing the case. The case further comprises a locking the cover shell in the close position and a biasing element adapted to cooperate with the locking mechanism for biasingly popping up the cover shell in the open position as the locking mechanism is released. The case disclosed combines simplicity and inexpensiveness to manufacture with durability and trouble-free in operation.

8 Claims, 5 Drawing Sheets

006,056,117

CD CARRYING CASE HAVING A BUILT-IN POP COVER

FIELD OF THE INVENTION

The present invention relates to the field of compact discs and is particularly concerned with a case for storing a compact disc having a built-in pop-up cover.

BACKGROUND

Compact discs (hereinafter called Cds) are recording media from which recorded information can be read out by means of a laser beam. By virtue of the extremely high density and fidelity of the recorded information therein, compact discs are becoming increasingly popular.

Typical compact discs have a flat disc-shaped body provided with a central aperture which facilitates the exact mounting on a read-out instrument such as a compact disc player.

While the CDs are relatively rugged and forgiving of minor scratches, dust and debris, they still must be stored and given protection. Indeed, scratches that sufficiently scatter the laser beam can block reading of the encoded information. A disc protective container also serves for the display of a label that attracts the buyer and informs the user of the disc.

Accordingly, when not in use, the compact discs are usually kept in compact disc carrying cases. These laser discs carrying cases commonly comprise a cover shell hinged to a base shell and locked by lock means. A tray is typically provided within the base shell for receiving and holding the disc. The tray may have a central engagement means for holding the center aperture of the CD. Commonly, those engagement means are rosettes typically made up of a series of tines raised in a circle and radially extending inward towards a center pushing area.

One of the major drawbacks associated with such conventional CD carrier is the difficulty with which the cover shell is pivoted from the base shell in an open position. Indeed, because the cover and base shell are typically formed of clear polystyrene, it is difficult to distinguish them. Consequently, it is not uncommon for the user, in attempting to grasp the base shell with one hand, to mistakenly place the thumb and fingers of that hand on the cover side walls, thinking them to be part of the platform, while correctly placing the fingers of the other hand on the platform back wall and lifting, with the thumb of that hand, the cover front border. Since both hands are inadvertently holding the cover, the container cannot be opened.

The proper technique for opening most of the cases presently on the market is to place the fingers of both hands on the base shell back wall, the thumb of both hands on the base shell front wall, one of which lifts the cover front border. While this works relatively well, once one is experienced, the operation can prove to be difficult since it requires manual dexterity.

Prior attempts to provide CD carrying cases which are more easy and simple to open proved to be unsatisfactory as those prior art cases are of complex construction and expensive to manufacture. Examples of such prior art cases are described by way of examples, in U.S. Pat. Nos. 5,000,316; 5,213,209; 5,265,721; 5,346,074; 5,515,979; 5,526,926; 5,549,199.

Also known in prior art, there are the laid-open applications GB-9,517,521 and GB-9,611,747, both in the name of Courchesne, the inventor of the present invention, which disclose CD carrying cases having a built-in pop-up cover comprising essentially a push-button for releasably locking the cover of the case on the base shell and cooperating with a V-shaped leaf-spring mounted at the rear end of the case on a hinge component. In each of those documents, the leaf-spring has an arm abutting on the top wall of the cover and another arm abutting on the bottom wall of the base shell. One of the drawbacks with CD cases is that it is still too expensive to be economically feasable.

Therefore, there is still a need for an improved CD carrying case that is economically feasable, long lasting and easy to built and use.

SUMMARY OF THE INVENTION

An object of the present invention is to provide a case for storing a compact disc that satisfies these above-mentioned needs.

In accordance with the present invention, this object is achieved with a case for storing a compact disc characterized in that it comprises a box-like base shell formed of a planar bottom wall, two opposite side walls, a rear wall and a front wall. The base shell is adapted to receive the compact disc. The case also comprises a cover shell sized to fit over the base shell and including a planar top wall, two opposite side walls and a rear end hingely connected to a rear end of the base shell. The cover shell is pivotable between an open position away from the base shell for opening the case and a close position against the base shell for closing the case. A locking mechanism is provided to releasably lock the cover shell in the close position. The case further comprises a biasing means adapted to cooperate with the locking mechanism for biasingly popping up the cover shell in the open position as the locking mechanism is released. The biasing means is characterized in that it comprises at least one elongated spring element, preferably a pair, associated with a corresponding side wall of the cover shell and extending along the rear end of the base shell. The spring element has a fixed end portion mounted on an inner surface of the base shell near the rear end thereof and a releasably compressible free end portion opposite the fixed end portion and extending toward the corresponding side wall of the cover shell. The free end portion has a free end adapted to engage in abutment a portion of the corresponding side wall. The free end portion of the spring element is disposed such that it is compressed as the cover shell is locked in the lock position and released as the cover shell is unlocked, thereby popping up the cover shell in the open position.

Preferably, the biasing means comprise for each spring element a sleeve secured to the inner surface of the base shell, preferably the inner surface of the bottom wall of the base shell. The sleeve comprises a bore sized to tightly receive the fixed end portion of the spring element.

Also preferably, said portion of each side wall of the cover shell engaged by a corresponding spring element consists of a stop block secured to an inner surface of the respective side wall.

The case for storing a CD in accordance with the present invention is reliable and long lasting since it minimizes the amount of components required to perform the pop-up opening operation. Also very importantly for this type of product which is part of a ferocious market is that the case according to the present invention combines simplicity and inexpensiveness to manufacture with durability and trouble-free in operation.

A non restrictive description of preferred embodiments of the present invention will now be given with reference to the appended drawings.

DETAILED DESCRIPTION

Figure 1:
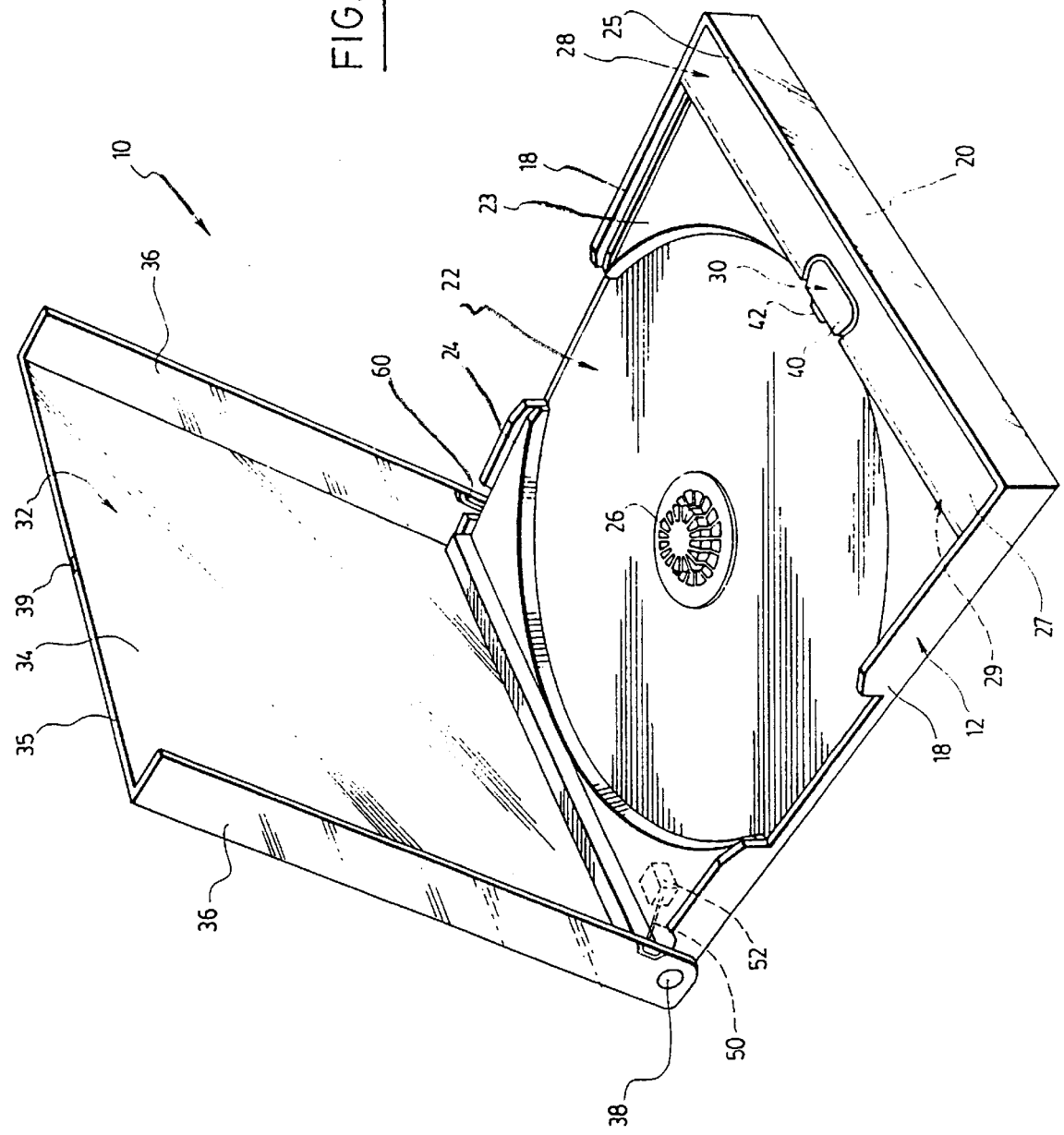
FIG. 1 is a perspective view of a first preferred embodiment of a CD carrying case according to the present invention in an opened configuration.
Figure 2:
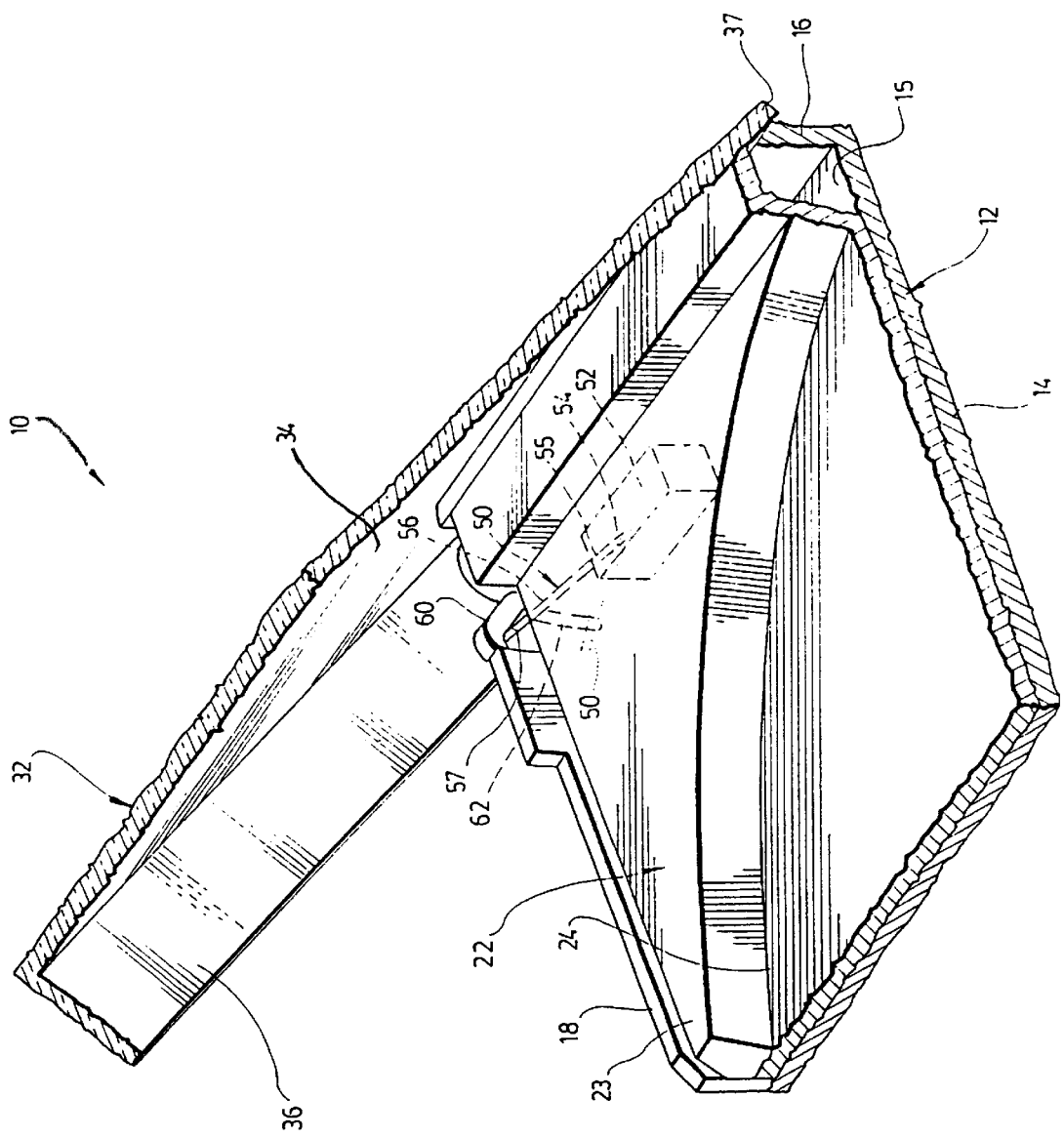
FIG. 2 is an enlarged perspective view of the left corner of the case of FIG. 1 showing a spring element mounted at that corner.

Referring to FIGS. 1 and 2, there is shown a CU carrying case (10) according to a first preferred embodiment of the present invention. As conventional CD cases, the case (10) includes a box-liked base shell (12) having a conventional substantially parallelepiped-shaped configuration. The base shell (12) includes a bottom wall (14), a perpendicularly extending rear wall (16), a pair of perpendicularly extending side walls (18) and a perpendicularly extending front wall (20). The base shell (12) is adapted to receive a compact disc (not illustrated). Preferably, the base shell (12) comprises a tray (22) inserted therein. The tray (22) which is positioned inside the base shell (12) has a planar surface (23) defining a substantially centrally disc-shaped recess (24). The disc-shaped recess (24) is preferably configured and sized so as to fittingly receive the compact disc. In this preferred embodiment, a centrally disposed rosette-type gripping component (26) extends integrally and substantially upwardly from the recess (24). The gripping component (26) is adapted to releasably secure the compact disc inside the recess (24). It has to be understood that the present invention is not limited to this particular means for receiving the compact disc and that anal other means can be used. At worst, the disc may be simply set on the bottom wall (14) of the base shell. The tray (22) includes an elevated front end section (28) extending from the planar surface (23) and positioned along a front end (25) of the base shell (12). As illustrated, the elevated front end section (28) defines a planar portion (27) and a riser (29), the riser (29) connecting this planar portion (27) to the planar surface (23) of the tray (22).

Figure 3:
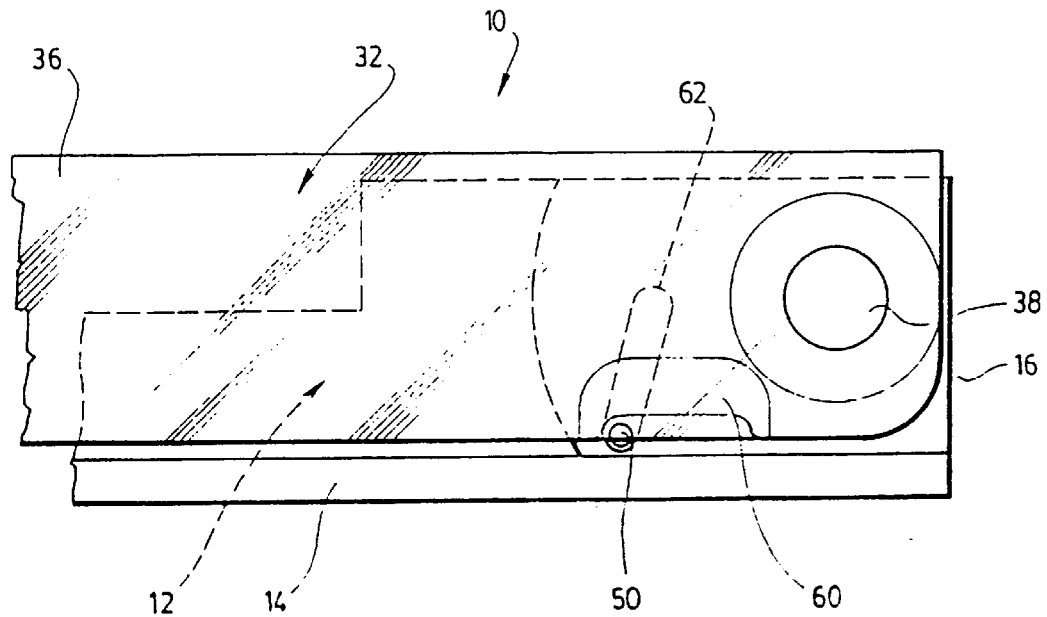
FIG. 3 is a fragmentary side elevational view of the rear side of the case of FIG. 1 seen from its right side and showing the case in a close position.

The case (12) further comprises a cover shell (32) sized to fit over the base shell (12) and including a planar top wall (34) and two opposite perpendicular side walls (36) extending integrally from the side peripheral edges of the cover shell (32). The cover shell (32) has a rear end (37) hingely connected to the back wall (16) of the base shell (12) such that the cover shell (32) is pivotable between an open position away from the base shell (12) for opening the case (10), as shown in FIG. 1, and a close position against the base shell (12) for closing the case (10), as shown in FIG. 3. Although not illustrated but easy to visualize, the top wall (34) of the cover shell (32), in the closed position, has a front edge (35) positioned along the riser (29) of the front end section (28). A hinge component (38) located at each rear corner of the base shell (12) hingely connects the cover shell (32) to the base shell (12). Each hinge component (38) preferably consists of a pivot knot) integrally formed on the outer surface of a corresponding side wall (18) of the base shell (12). This pivot knob is adapted to operatively engage an opening in the side wall (36) of the cover(34).

The base shell, the cover shell and the tray are preferably made of a thermosetting plastic such as polystyrene or any other thermosetting plastic known in the art.

The box shell and the cover shell may advantageously be translucent.

A locking mechanism is provided for releasably locking the cover shell (34) in the closed position. The locking mechanism preferably comprises a release push-button (30) located in the elevated front end section (28) of the tray (22). This push-button (30) is integrally formed by cutting the plastic of the front end section (28) and comprises a locking tongue (40) having a distal frontward protruding lip (42) which extends integrally from the back peripheral edge of the push-button (30). The locking tongue (40) of the push-button (30) and its lip (42) are adapted to cooperate with the front peripheral edge (35) of the cover shell (32) for releasably locking the cover shell (32) in a closed position. For this purpose, the front edge (35) of the cover shell is preferably provided with a protruding tip (39) devised to be engaged by the push-button (30). The locking tongue (40) is adapted to pivot upon pressure on the push-button (30) between a first position where it abuttingly contacts the front peripheral edge (35) of the cover shell (32) and a second position where it clears the same.

It should be understood that other types of locking mechanisms could be used with the present invention, as long as it enables; the cover shell to be releasably locked on the base shell.

Figure 4:
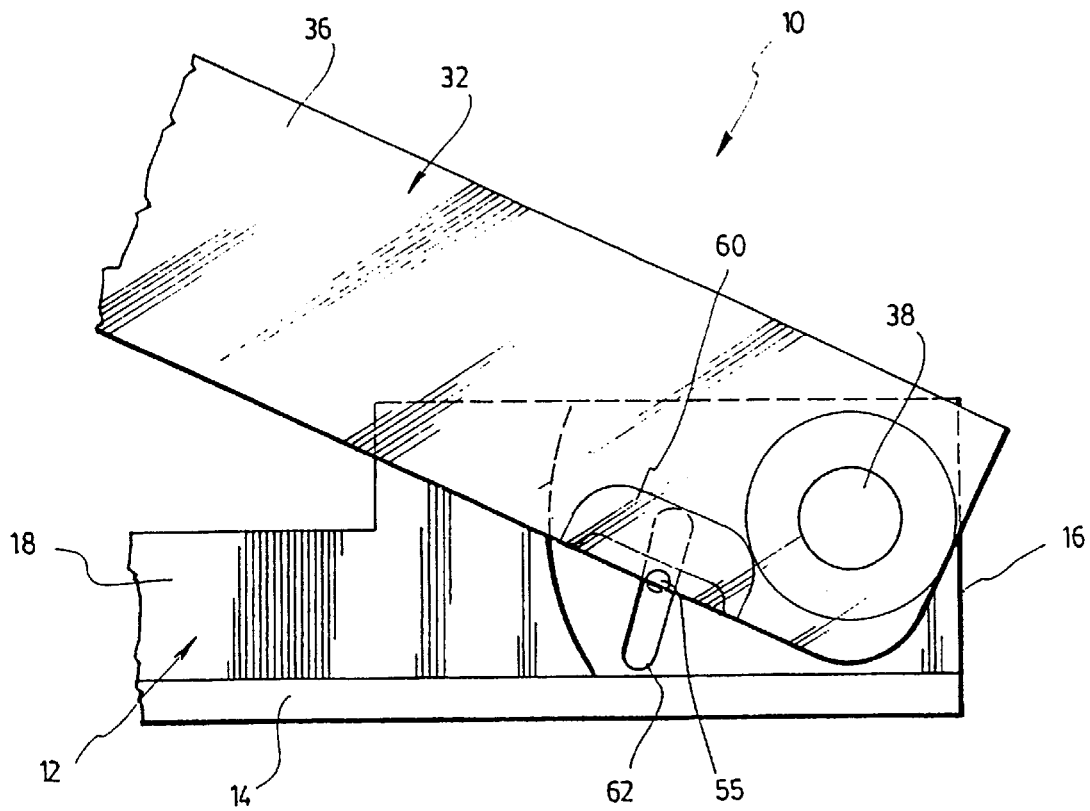
FIG. 4 is the same view as FIG. 3 showing the case partially open.

The case (10) according to the present invention further comprises a biasing mechanism adapted to cooperate with the push-button (30) for biasingly popping up the cover shell (32) in the open position as the locking mechanism is released. Referring more particularly to FIGS. 2 to 4, the biasing mechanism comprises at least on one side of the base shell (12), and preferably on both sides, near the rear end thereof, an elongated spring element (50), as a metallic rod or a spring leaf, associated with a corresponding side wall (36) of the cover shell (32) and extending along the rear end of the base shell (12), the rear end being defined by the rear wall (16) of the base shell (12).

The spring element (50) has a fixed end portion (55) mounted on an inner surface (15) of the base shell (12) near the rear end thereof, preferably by means of a box-shaped sleeve (52) secured to the base shell (12). The sleeve may be simply glued to the base shell (12). The sleeve (52) is provided with a bore (54) sized to tightly receive the fixed end portion (55) of the spring element (50). In the preferred embodiment illustrated in FIGS. 1 to 4, this fixed end portion (55) of the spring element (50) is secured to the inner surface (15) of the bottom wall (14). However, in another preferred embodiment of the present invention such as the one illustrated in FIGS. 5 and 6, this fixed end portion (55) may very well be secured to the back wall (16) of the base shell (12).

The spring element (50) further comprises a releasably compressible free end portion (56) extending toward a corresponding side wall (36) of the cover shell (32) and having a free end (57) adapted to engage in abutment a portion of the corresponding side wall (36). As illustrated in FIG. 2, in the case of the first preferred embodiment, that portion of the side wall (26) of the cover shell (32) engaged by a corresponding spring element consists of a stop block

(60) integrally formed in the side wall (36) or secured to it by means of glue.

Figure 6:
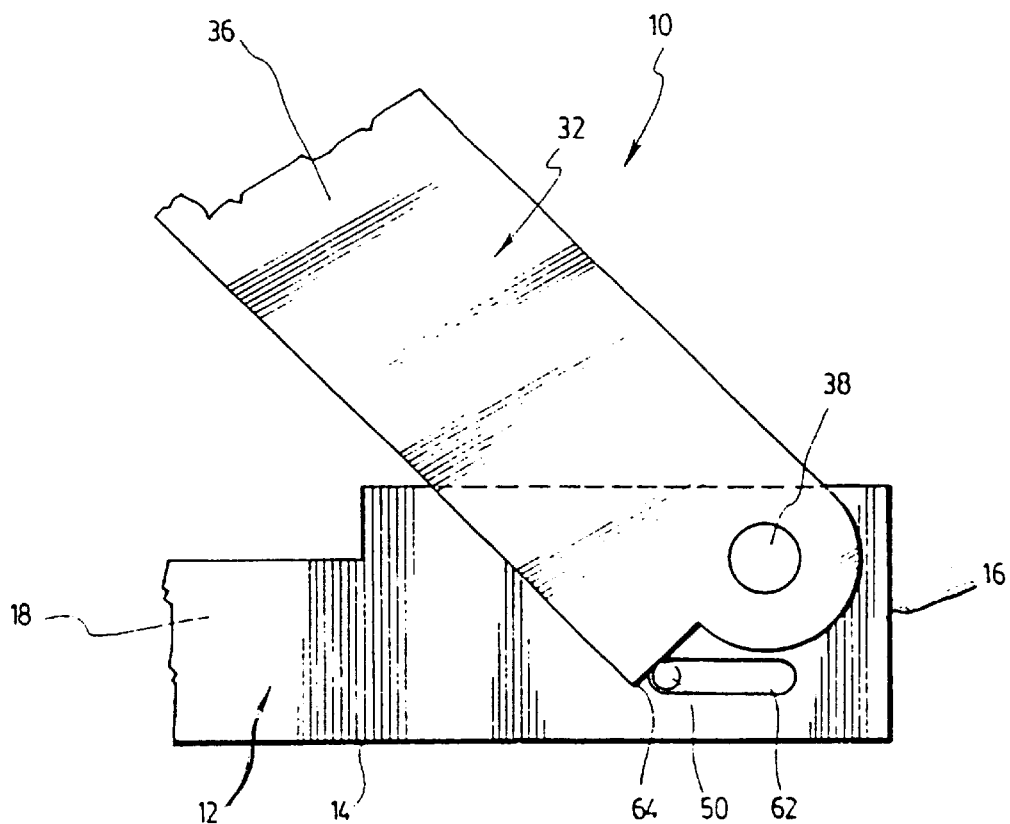
FIG. 6 is a similar view as FIG. 5 showing a second preferred embodiment of the present invention.
Figure 7:
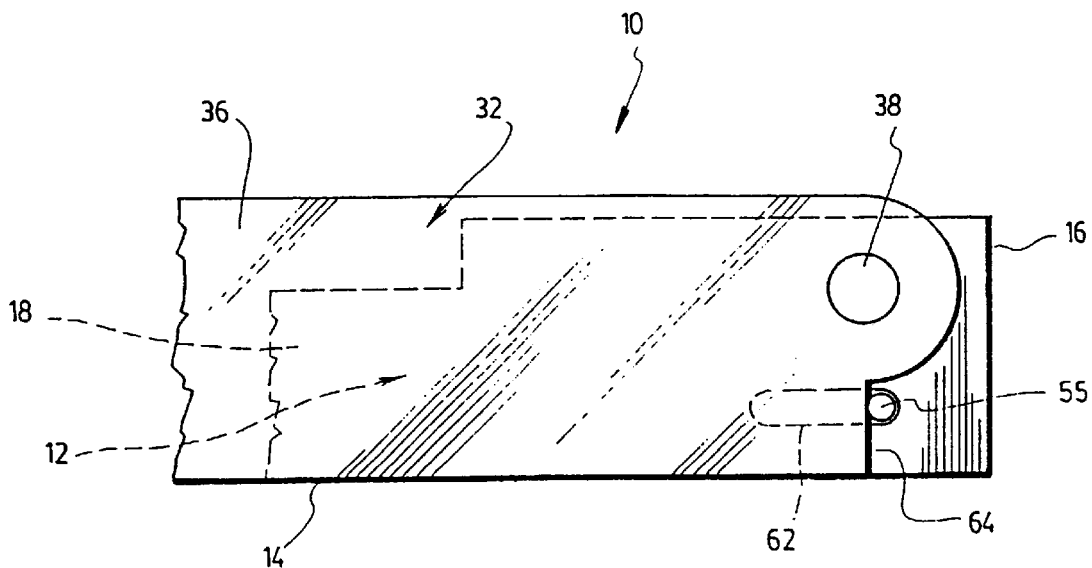
FIG. 7 is a similar view as FIG. 3 showing the second preferred embodiment shown in FIG. 6.

In the second preferred embodiment illustrated in FIGS. 6 and 7, the portion of the side wall (36) of the cover shell (32) engaged by a corresponding spring element consists of the rear end (64) of that side wall (36).

In both preferred embodiments, the free end portion (56) of the spring element (50) is disposed such that it is compressed as the cover shell (32) is in the lock position and released as the cover shell (32) is unlocked, thereby popping up the cover shell (32) in the open position.

As can be appreciated, in the preferred embodiments illustrated, the top wall (34) of the cover shell (32) is slightly wider than the bottom wall (14) of the base shell (12), whereby the side walls (36) of the cover shell (32) are extending outside the base shell (12) as the case is closed. Therefore, in order to leave a free passage for the free end portion (56) of the spring element (50) up to the stop block (60), the side wall (18) of the base shell (12) and of the tray (22) may be provided with a slot (62) or it could be simply cut. However, it should be understood that in another preferred embodiment (not illustrated), the side walls of the cover shell could easily extend inside the base shell. In that case, there is no need for providing the side wall of the base shell with a slot or passage.

Figure 5:
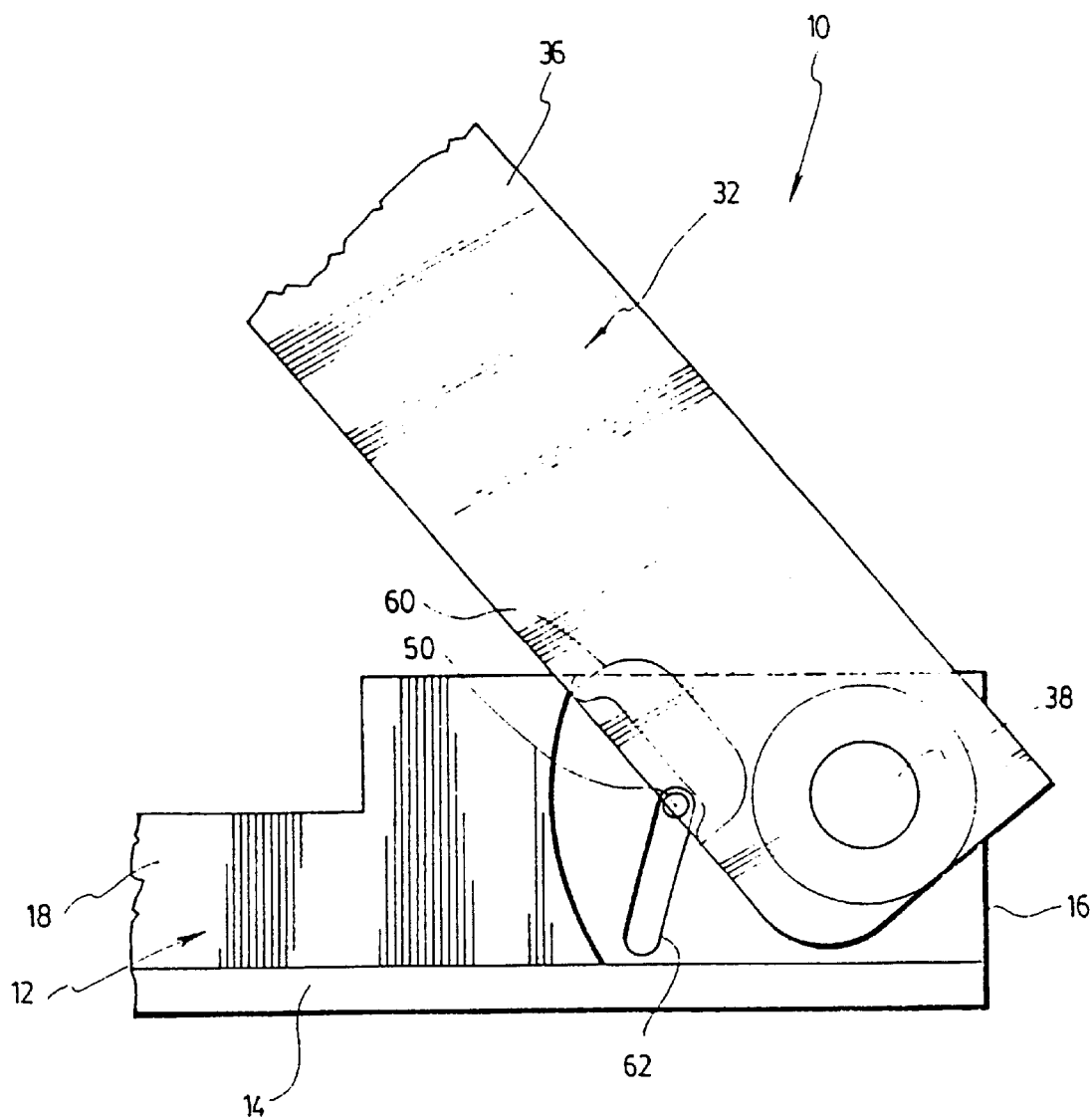
FIG. 5 is the same view as FIGS. 3 and 4 showing the case in an open configuration.

Referring to FIGS. 3 to 7, the slot (62) allows the free end (56) of a corresponding spring element (50) to freely move upwards and downwards, as shown in FIGS. 3 to 5, or back and forth, as shown in FIGS. 6 and 7.

The spring element (50) of the first preferred embodiment is preferably mounted so as to be slightly angulated upwards with respect to the bottom wall (14) of the base shell (12).

In use, both the spring elements (50) are adapted to simultaneously bias against a corresponding side wall (36) of the cover shell (32) so that when the push-button (30) is pressed to release the cover shell (32), each spring element (50) biasingly pops the cover shell (32) towards an open position, as shown in FIGS. 1, 2, 5 and 7.

Referring to FIG. 3, the cover shell (32) is shown in a closed position, the stop block (60) abutting against the spring element (50). In FIG. 4, the push-button has just been pressed for releasing the cover shell (32) and the spring element (50) has started to regain its relaxed shape, thereby lifting up the cover (32). In FIG. 5, the spring element (50) is completely relaxed, thereby keeping the cover (32) open. FIGS. 6 and 7 show a similar sequence for the second preferred embodiment.

In another preferred embodiment of the present invention (not illustrated), the biasing mechanism may comprise a single flexible metal rod wedge between low walls and extending generally in parallel with the back wall of the base shell. The metal rod has two opposite free ends each being adapted to receive in abutment a corresponding rear end of the cover shell in a closed position. As for the preferred embodiment illustrated in FIGS. 1 to 7, the free ends are acting as biasing means for biasingly popping up the cover shell towards its open position as the press-button is pressed down.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

I claim:

1. A case (10) for storing a compact disc characterized in that it comprises:
    a box-like base shell (12) formed of a planar bottom wall (14), two opposite side walls (18), a rear wall (16) and a front wall (20), the base shell (12) being adapted to receive the compact disc;
    a cover shell (32) sized to fit over the base shell (12) and including a planar top wall (34), two opposite side walls (36) and a rear end (37) hingely connected to a rear end of the base shell (12), the cover shell (32) being pivotable between an open position away from the base shell (12) for opening the case (10) and a close position against the base shell (12) for closing the case (10);
    a locking mechanism (30) to releasably lock the cover shell (32) in the close position; and
    biasing means adapted to cooperate with the locking mechanism (30) for biasingly popping up the cover shell (32) in the open position as the locking mechanism (30) is released, the biasing means comprising:
        at least one elongated spring element (50) associated with a corresponding side wall (18) of the cover shell (32) and extending along the rear end of the base shell (12), the spring element (50) having:
            a fixed end portion (55) mounted on an inner surface (15) of the base shell (12) near the rear end (16) thereof; and
            a releasably compressible free end portion (56) extending toward said corresponding side wall (18) of the cover shell (12) and having a free end (57) adapted to engage in abutment a portion (60) of said corresponding side wall (18), the free end portion (56) being disposed such that it is compressed as the cover shell (32) is locked in the lock position and released as the cover shell (32) is unlocked, thereby popping up the cover shell (32) in the open position.

2. A case (10) for storing a compact disc as claimed in claim 1, characterized in that the biasing means comprises a pair of said at least one elongated spring element (50) each associated with a corresponding side wall (18) of the cover shell (12).

3. A case (10) for storing a compact disc as claimed in claim 2, characterized in that the biasing means comprise, for each spring element (50), a sleeve (52) secured to said inner surface (15) of the base shell (12), said sleeve comprising a bore (54) sized to tightly receive the fixed end portion (55) of the spring element (50).

4. A case (10) for storing a compact disc as claimed in claim 3, characterized in that each of the sleeves (52) is secured to an inner surface (15) of the bottom wall (14) of the base shell (12).

5. A case (10) for storing a compact disc as claimed in claims 3 or 4, characterized in that said portion of each side wall (18) of the cover shell (32) engaged by a corresponding spring element (50) consists of a stop block (60) secured to an inner surface (15) of the respective side wall (18).

6. A case (10) for storing a compact disc as claimed in claim 5, characterized in that:
    the base shell (12) comprises a tray (22) inserted therein and having a planar surface (23) defining a substantially disc-shaped recess (24) to receive the compact disc, the tray (22) further including an elevated front end section (28) extending from the planar surface (23) and positioned along a front end (25) of the base shell (12), the elevated front end section (28) defining a planar portion (27) and a riser (29) connecting the planar portion (27) to the planar (23) of the tray (22); and that the top wall (34) of the cover shell (32) has a front edge (35) positioned along the riser (29) of the front end section (28) as the case (10) is in the close position.

7. A case (10) for storing a compact disc as claimed in claim 6, characterized in that the locking mechanism (30) comprises a push-button 130) located in the front end section (28) of the tray (22) and adapted to cooperate with a front edge (35) of the cover shell (32).

8. A case (10) for storing a compact disc as claimed in claim 7, wherein the push-button (30) is integrally formed in the front end section (28) of the tray (22) and comprises a locking tongue (40) Protruding from a rear edge of the push-button (30), the locking tongue (40) being adapted to pivot upon pressure on the push-button between a first position, where it abuttingly contacts the front edge (35) of the cover shell (32), and a second position where it clears the same.

* * * * *